United States Patent
Kim et al.

(10) Patent No.: US 10,539,828 B2
(45) Date of Patent: Jan. 21, 2020

(54) POLARIZING LIGHT EMITTING PLATE AND DISPLAY DEVICE HAVING THE SAME

(71) Applicant: Samsung Display Co., Ltd., Yongin-Si, Gyeonggi-Do (KR)

(72) Inventors: Daehyun Kim, Hwaseong-si (KR); Jaebyung Park, Seoul (KR); Hyundeok Im, Seoul (KR); Jonghyuk Kang, Suwon-si (KR); Hyunmin Cho, Seoul (KR)

(73) Assignee: SAMSUNG DISPLAY CO., LTD., Gyeonggi-Do (KR)

(*) Notice: Subject to any disclaimer, the term of this patent is extended or adjusted under 35 U.S.C. 154(b) by 1 day.

(21) Appl. No.: 15/498,721

(22) Filed: Apr. 27, 2017

(65) Prior Publication Data

US 2017/0357119 A1    Dec. 14, 2017

(30) Foreign Application Priority Data

Jun. 8, 2016    (KR) .................. 10-2016-0071254

(51) Int. Cl.
| | | |
|---|---|---|
| *G02F 1/1335* | (2006.01) | |
| *G02B 5/30* | (2006.01) | |
| *B82Y 20/00* | (2011.01) | |

(52) U.S. Cl.
CPC ....... *G02F 1/13362* (2013.01); *G02B 5/3033* (2013.01); *G02F 1/133528* (2013.01); *G02F 1/133617* (2013.01); *G02F 1/133621* (2013.01); *B82Y 20/00* (2013.01); *G02F 2001/133548* (2013.01); *G02F 2001/133614* (2013.01); *G02F 2202/28* (2013.01); *Y10S 977/762* (2013.01)

(58) Field of Classification Search
CPC .......... G02F 1/133606; G02F 2202/28; G02F 2001/133607
See application file for complete search history.

(56) References Cited

U.S. PATENT DOCUMENTS

| | | | |
|---|---|---|---|
| 2007/0092662 A1* | 4/2007 | Matsuno | G02B 1/105 428/1.3 |
| 2008/0106672 A1* | 5/2008 | Kim | G02B 5/3058 349/62 |
| 2009/0079905 A1* | 3/2009 | Kimura | G02B 6/0053 349/62 |
| 2009/0128739 A1* | 5/2009 | Kumasawa | G02B 5/0215 349/64 |
| 2010/0283072 A1 | 11/2010 | Kazlas et al. | |
| 2011/0044058 A1* | 2/2011 | Shim | G02B 6/0038 362/311.06 |
| 2012/0113672 A1 | 5/2012 | Dubrow et al. | |
| 2014/0009964 A1 | 1/2014 | Dubrow et al. | |

(Continued)

FOREIGN PATENT DOCUMENTS

| | | |
|---|---|---|
| CN | 104360425 A | 2/2015 |
| KR | 1020130046495 A | 5/2013 |

(Continued)

*Primary Examiner* — Alexander P Gross
(74) *Attorney, Agent, or Firm* — Cantor Colburn LLP (57) ABSTRACT

A polarizing light emitting plate includes a polarizing layer having a polarizing axis substantially parallel to a first direction, a quantum rod layer including quantum rods aligned in the first direction, and an attachment layer between the polarizing layer and the quantum rod layer and comprising an adhesive material.

25 Claims, 9 Drawing Sheets (56) References Cited

U.S. PATENT DOCUMENTS

| | | | |
|---|---|---|---|
| 2014/0362556 A1* | 12/2014 | Cho | B32B 3/30 |
| | | | 362/19 |
| 2015/0241622 A1 | 8/2015 | Jung et al. | |
| 2017/0033267 A1* | 2/2017 | Tamaki | H01L 33/502 |
| 2017/0108726 A1* | 4/2017 | Yanai | G02F 1/13362 |
| 2017/0123267 A1* | 5/2017 | Yanai | G02F 1/133536 |
| 2017/0248748 A1* | 8/2017 | Satake | G02B 6/005 |

FOREIGN PATENT DOCUMENTS

| | | |
|---|---|---|
| KR | 1020140074446 A | 6/2014 |
| TW | 201606392 A | 2/2016 |

\* cited by examiner

POLARIZING LIGHT EMITTING PLATE AND DISPLAY DEVICE HAVING THE SAME

This U.S. patent application claims priority to Korean Patent Application No. 10-2016-0071254, filed on Jun. 8, 2016, and all the benefits accruing therefrom under 35 U.S.C. § 119, the content of which in its entirety is herein incorporated by reference.

BACKGROUND

1. Field of Disclosure

The disclosure relates to a polarizing light emitting plate and a liquid crystal display device having the same. More particularly, the disclosure relates to a polarizing light emitting plate having improved efficiency and reduced thickness and a liquid crystal display device having the polarizing light emitting plate.

2. Description of the Related Art

A liquid crystal display device is widely used as a flat display device. The liquid crystal display device is applied to various electronic devices, e.g., a television set, a monitor, a notebook, and a mobile phone, etc., to display an image.

The liquid crystal display device includes a liquid crystal display panel displaying the image and a backlight unit providing a light to the liquid crystal display panel. The liquid crystal display panel controls an intensity of an electric field applied to a liquid crystal layer interposed between two substrates and controls an amount of the light passing through the two substrates, thereby displaying the image.

In addition, the liquid crystal display device typically includes two polarizing plates respectively provided to upper and lower portions of the liquid crystal display panel. The polarizing plates have polarizing axes perpendicular to each other.

SUMMARY

The disclosure provides a polarizing light emitting plate having improved efficiency and reduced thickness.

The disclosure provides a liquid crystal display device including the polarizing light emitting plate.

According to an embodiment of the inventive concept, a polarizing light emitting plate includes a polarizing layer having a polarizing axis substantially parallel to a first direction, a quantum rod layer including quantum rods aligned in the first direction, and an attachment layer between the polarizing layer and the quantum rod layer, where the attachment layer includes an adhesive material.

In an embodiment, the attachment layer may include a first part and a second part alternately arranged with the first part when viewed in a plan view, the first part may have a first refractive index, and the second part may have a second refractive index different from the first refractive index.

In an embodiment, the attachment layer may have an average refractive index smaller than a refractive index of the quantum rod layer.

In an embodiment, the first part is defined by an air filled in a space.

In an embodiment, the first part may include a first adhesive material, and the second part may include a second adhesive material.

In an embodiment, an included angle between an upper surface of the quantum rod layer and a boundary surface between the first and second parts is in a range from about 70 degrees to about 110 degrees.

In an embodiment, the attachment layer may further include a plurality of bubbles disposed in the adhesive material, and the bubbles have a refractive index smaller than a refractive index of the adhesive material.

In an embodiment, the polarizing light emitting plate may further include a first barrier layer attached to an outer surface of one of the quantum rod layer and the polarizing layer.

In an embodiment, the polarizing light emitting plate may further include a second barrier layer attached to an outer surface of the other of the quantum rod layer and the polarizing layer.

In an embodiment, the first and second barrier layers may have different vapor permeabilities from each other.

In an embodiment, the quantum rods may include first quantum rods and second quantum rods, the first quantum rods may convert a first color light to a second color light, the second quantum rods may convert the first color light to a third color light, and the first color light, the second color light and the third color light may have different colors from each other.

According to another embodiment of the inventive concept, a liquid crystal display device includes a backlight unit, a liquid crystal display panel disposed above the backlight unit, a polarizing light emitting plate interposed between the liquid crystal display panel and the backlight unit, where the polarizing light emitting plate includes a quantum rod layer including quantum rods aligned in a predetermined direction, and an adhesive layer interposed between the polarizing light emitting plate and the liquid crystal display panel to attach the polarizing light emitting plate to a lower surface of the liquid crystal display panel.

In an embodiment, the polarizing light emitting plate may further include a lower polarizing layer attached to the quantum rod layer.

In an embodiment, the lower polarizing layer may have a polarizing axis substantially parallel to a first direction, and the quantum rods may be aligned in the first direction.

In an embodiment, the liquid crystal display device may further include an upper polarizing layer disposed on an upper surface of the liquid crystal display panel and having a polarizing axis substantially parallel to a second direction substantially perpendicular to the first direction.

In an embodiment, the polarizing light emitting plate may further include an upper barrier layer interposed between the quantum rod layer and the liquid crystal display panel and a lower barrier layer disposed under the quantum rod layer.

In an embodiment, the upper barrier layer may be disposed on an upper surface of the lower polarizing layer, and the lower barrier layer may be disposed on a lower surface of the quantum rod layer.

In an embodiment, the upper barrier layer may be attached to a lower surface of the liquid crystal display panel.

In an embodiment, the lower barrier layer may have a vapor permeability smaller than a vapor permeability of the upper barrier layer.

In an embodiment, the vapor permeability of the lower barrier layer may be equal to or smaller than about $10^{-3}$ g/m² day.

In an embodiment, the backlight unit may output a first color light, which is linearly polarized in a first direction, and the quantum rods may be aligned in the first direction.

In an embodiment, the quantum rods may include first quantum rods and second quantum rods, the first quantum rods may convert a portion of the first color light to a second color light, the second quantum rods may convert a portion of the first color light to a third color light, and the first color light, the second color light and the third color light may have different colors from each other.

In an embodiment, the first color light may have a wavelength smaller than wavelengths of the second and third color lights.

In an embodiment, the liquid crystal display panel may include a lower base substrate, an in-cell polarizing layer disposed on the lower base substrate, a liquid crystal layer disposed on the in-cell polarizing layer, and an upper base substrate disposed on the liquid crystal layer.

In an embodiment, the in-cell polarizing layer may have a polarizing axis substantially parallel to a first direction, and the quantum rods may be aligned in the first direction.

In an embodiment, the in-cell polarizing layer may include a wire grid pattern extending in a second direction substantially vertical to the first direction.

In an embodiment, the backlight unit may output a first color light having a first wavelength, and the quantum rods may convert the first color light to a second color light having a second wavelength different from the first wavelength.

In an embodiment, a color of a light obtained by mixing the first and second color lights may be a white color.

According to embodiments set forth herein, the polarizing light emitting plate includes the quantum rod layer attached to the lower polarizing layer. Accordingly, the number of barrier layers provided to prevent the quantum rod layer from burning or deteriorating due to foreign substances, e.g., moisture, oxygen, etc., may be reduced. As a result, the thickness and the production cost of the polarizing light emitting plate may be reduced. In such an embodiment, the liquid crystal display device includes the polarizing light emitting plate attached to the attachment layer having an optical structure, such that a color reproduction rate and an optical efficiency of the liquid crystal display device may be improved.

BRIEF DESCRIPTION OF THE DRAWINGS

The above and other features of the disclosure will become readily apparent by reference to the following detailed description when considered in conjunction with the accompanying drawings, in which.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure.

Like numerals refer to like elements throughout. In the drawings, the thickness of layers, films, and regions are exaggerated for clarity. The use of the terms first, second, etc. do not denote any order or importance, but rather the terms first, second, etc. are used to distinguish one element from another. It is to be understood that the singular forms "a," "an," and "the" include plural referents unless the context clearly dictates otherwise.

It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof. It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system).

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, exemplary embodiments of the invention will be described in detail with reference to the accompanying drawings.

Figure 1:
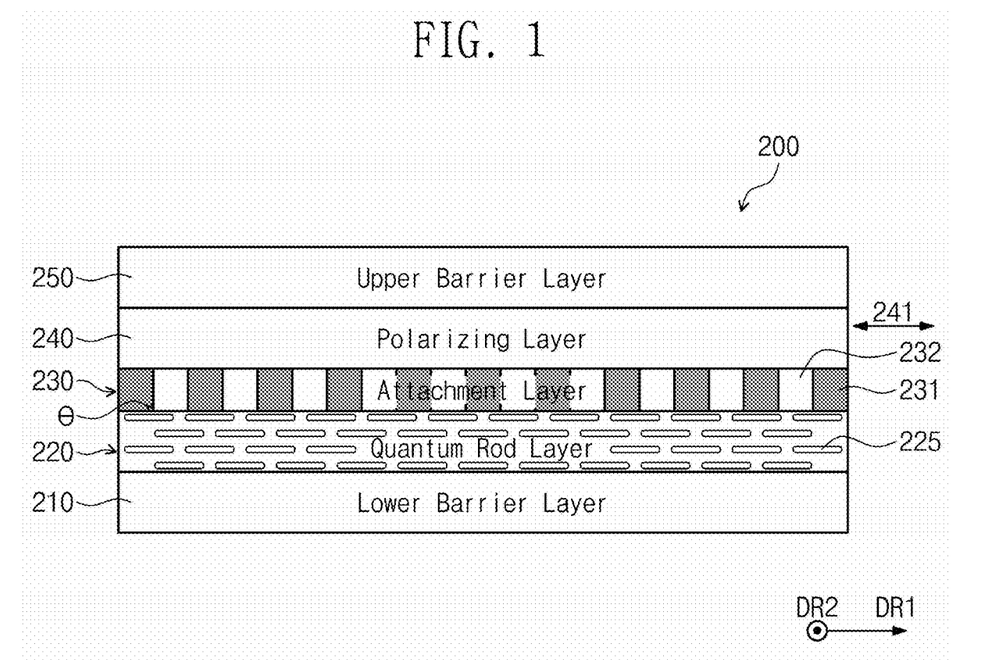
FIG. 1 is a cross-sectional view showing a polarizing light emitting plate according to an exemplary embodiment of the disclosure.
Figure 2:
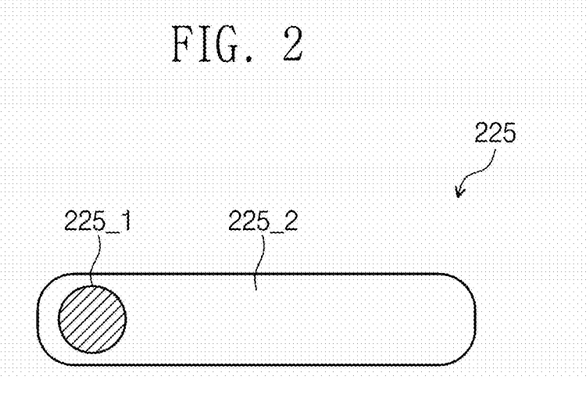
FIG. 2 is a cross-sectional view showing a quantum rod shown in FIG. 1.

FIG. 1 is a cross-sectional view showing a polarizing light emitting plate 200 according to an exemplary embodiment of the disclosure, and FIG. 2 is a cross-sectional view showing a quantum rod shown in FIG. 1.

Referring to FIG. 1, an exemplary embodiment of the polarizing light emitting plate 200 includes a lower barrier layer 210, a quantum rod layer 220, an attachment layer 230, a polarizing layer 240, and an upper barrier layer 250. The polarizing light emitting plate 200 may generate a light that is linearly polarized in a predetermined direction as described below.

The quantum rod layer 220 includes quantum rods 225. In an exemplary embodiment, each quantum rod 225 may include a core 225-1 and a shell 225-2 surrounding the core 225-1 as shown in FIG. 2, but not being limited thereto or thereby. Alternatively, the shell 225-2 may be omitted, and thus each quantum rod 225 may include only the core 225-1.

Each quantum rod 225 has a bar shape with a long axis (e.g., a longitudinal axis) and a short axis (e.g., a transverse axis). In one exemplary embodiment, for example, each quantum rod 225 may have a substantially circular shape in a cross-section substantially parallel to the short axis.

In one exemplary embodiment, for example, the shell 225-2 may have a single-layer structure or a multi-layer structure, and may include an alloy, an oxide-based material, or an impurity-doped material. In such an embodiment, a ratio of the short axis to the long axis of the shell 225-2 may be in a range of about 1:1.1 to about 1:30.

In one exemplary embodiment, for example, the core 225-1 may include a II-VI, III-V, VI-IV, or IV group semiconductor, an alloy, or a compound thereof. In an exemplary embodiment, where the core 225-1 includes a II-VI group material, the core 225-1 may include CdSe, CdS, CdTe, ZnO, ZnSe, ZnS, ZnTe, HgSe, HgTe, CdZnSe, or a compound thereof. In an exemplary embodiment, where the core 225-1 includes a III-V group material, the core 225-1 may include InP, InN, GaN, InSb, InAsP, InGaAs, GaAs, GaP, GaSb, AlP, AlN, AlAs, AlSb, CdSeTe, ZnCdSe, or a compound thereof. In an exemplary embodiment, where the core 225-1 includes a VI-IV group material, the core 225-1 may include PbSe, PbTe, PbS, PbSnTe, Tl2SnTe5, or a compound thereof.

In an exemplary embodiment, the quantum rods 225 may be aligned in a predetermined direction. In one exemplary embodiment, for example, the quantum rods 225 may be aligned to allow the long axis of each quantum rod 225 to be substantially parallel to a first direction DR1. In one exemplary embodiment, for example, the quantum rods 225 may be aligned by using a voltage applying method, an alignment method with an alignment layer, an alignment method with a self-aligned monomer, and an alignment method with a reactive mesogen material.

The polarizing layer 240 includes a first polarizing axis 241 substantially parallel to the first direction DR1. The polarizing layer 240 transmits only light components polarized parallel to the first polarizing axis 241 among components of the light incident thereto and absorbs or reflects light components polarized parallel to a second direction DR2 vertical to the first direction DR1. Here, a thickness direction of the polarizing layer 240 may be normal to a plane defined by the first and second directions DR1 and DR2. The polarizing layer 240 may be referred to as a lower polarizing layer.

The polarizing layer 240 may be formed by, after allowing dichroic iodine or dichroic dye to be adsorbed onto a polyvinyl alcohol resin film, drawing the resin film along the elongation direction corresponding to the second direction DR2.

The attachment layer 230 is interposed between the polarizing layer 240 and the quantum rod layer 220. In one exemplary embodiment, for example, the attachment layer 230 may be attached to an entire surface of the polarizing layer 250 and an entire surface of the quantum rod layer 220, or may be attached to a portion of a surface of the polarizing layer 250 and a portion of a surface of the quantum rod layer 220.

Herein, the expression that one layer (or member) is attached to another layer (or another member) may mean not only that the one layer is directly attached to the another layer, but also that the one layer is indirectly attached to the another layer after being attached to a different layer therebetween.

The attachment layer 230 attaches the polarizing layer 240 and the quantum rod layer 220 to each other. The attachment layer 230 includes an adhesive material having an adhesive force. The adhesive material may include, for example, a transparent resin having the adhesive force. The adhesive material may include an acrylic- or silicon-based resin.

In an exemplary embodiment, as shown in FIG. 1, the lower barrier layer 210 is disposed on a lower surface of the quantum rod layer 220. The lower barrier layer 210 is attached to the quantum rod layer 220 using an adhesive material, e.g., an optically clear adhesive.

In an exemplary embodiment, as shown in FIG. 1, the upper barrier layer 250 is disposed on an upper surface of the polarizing layer 240. A lower surface of the upper barrier layer 250 may be attached to the polarizing layer 240 by the optically clear adhesive.

When the polarizing layer 240 and the quantum rod layer 220 are exposed to the outside, the polarizing layer 240 and the quantum rod layer 220 may be burned and deteriorated due to external oxygen, moisture, or other foreign substance, and as a result, polarizing characteristics and light emitting characteristics may be deteriorated.

In such an embodiment, the upper and lower barrier layers 250 and 210 effectively prevent the polarizing layer 240 and the quantum rod layer 220 from being exposed to the outside and protect polarizing layer 240 and the quantum rod layer 220 from external oxygen, moisture, or other foreign substance. In such an embodiment, the upper barrier layer 250 effectively prevents the foreign substance from entering the polarizing layer 240 and the quantum rod layer 220 from the upper surface side of the polarizing layer 240. In such an embodiment, the lower barrier layer 210 prevents the foreign substance from entering the polarizing layer 240 and the quantum rod layer 220 from the lower surface side of the polarizing layer 240.

In one exemplary embodiment, for example, the upper and lower barrier layers 250 and 210 have a vapor permeability in a range from about $10^{-3}$ gram per square meter and per day ($g/m^2$ day) to about 1 $g/m^2$ day.

In an exemplary embodiment, where the upper barrier layer 250 is directly attached to the lower surface of a lower base substrate 330 of a liquid crystal display panel 300, the lower base substrate 330 may prevent the foreign substance from entering the polarizing layer 240 and the quantum rod layer 220 together with the upper barrier layer 250. In such an embodiment, the vapor permeability of the upper barrier layer 250 may be smaller than the vapor permeability of the lower barrier layer 210. In one exemplary embodiment, for example, the vapor permeability of the upper barrier layer 250 is in a range from about $10^{-3}$ $g/m^2$ day to about 1 $g/m^2$ day, and the vapor permeability of the lower barrier layer 210 is in a range from about $10^{-6}$ $m^2$ day to about $10^{-3}$ $g/m^2$ day.

In general, a conventional polarizing plate typically includes a polarizing layer and barrier layers attached to upper and lower surfaces of the polarizing layer, respectively, to protect the polarizing layer. Similar to the conventional polarizing plate, a conventional quantum rod plate typically includes a quantum rod layer and barrier layers attached to upper and lower surfaces of the quantum rod layer, respectively, to protect the quantum rod layer. In an exemplary embodiment, where the lower surface of the polarizing layer 240 is attached to the upper surface of the quantum rod layer 220 as described herein, two barrier layers respectively attached to the lower surface of the polarizing layer 240 and the upper surface of the quantum rod layer 220 may be omitted. Thus, in such an embodiment, the barrier layers, which are relatively expensive compared to the polarizing layer 240 and the quantum rod layer 220, may be omitted, such that a production cost of the polarizing light emitting plate 200 may be reduced, and a thickness of the polarizing light emitting plate 200 may be reduced.

The attachment layer 230 may have an optical structure to improve an optical efficiency of the polarizing light emitting plate 200. The optical structure is obtained by alternately arranging two materials (or parts) having different refractive indices when viewed in a plan view. The two materials may be periodically or randomly arranged when viewed in a plan view.

In one exemplary embodiment, for example, the attachment layer 230 may include first and second parts 231 and 232. In an exemplary embodiment, as shown in FIG. 1, the first and second parts 231 and 232 may be alternately arranged with each other in the first direction DR1. In one exemplary embodiment, for example, the first part 231 may include an adhesive material, such as the optically clear adhesive. In one exemplary embodiment, for example, a hole or an empty space is defined between the first parts 231, and the second part 232 may be defined by an air filled in the hole. Portions of the upper surface of the quantum rod layer 220 may be exposed through the second parts 232. The second part 232 may be defined by forming the adhesive material on portions of the upper surface of the quantum rod layer 220.

In an exemplary embodiment, an included angle (θ) between an upper surface of the quantum rod layer 220 and a boundary surface between the first and second parts 231 and 232 may be about 90 degrees. In an exemplary embodiment, the boundary surface between the first and second parts 231 and 232 may be inclined, and the included angle (θ) between the upper surface of the quantum rod layer 220 and the boundary surface between the first and second parts 231 and 232 may be in a range from about 70 degrees to about 110 degrees.

In one exemplary embodiment, for example, a path of the lights passing through the attachment layer 230 may be controlled by the first and second parts 231 and 232. Accordingly, the attachment layer 230 may perform a condensing function on lights as a conventional light condensing sheet (or a prism sheet), and the lights generated by the polarizing light emitting plate 200 (or the lights passing through the polarizing light emitting plate 200) may travel in a vertical direction, that is, a direction vertical to the first and second directions DR1 and DR2. In one exemplary embodiment, for example, the boundary surface between the first and second parts 231 and 232 may refract or reflect the light such that the path of the lights becomes vertical. Thus, a brightness and an angle profile of the display device, to which the polarizing light emitting plate 200 is applied, may be controlled and improved.

Figure 3:
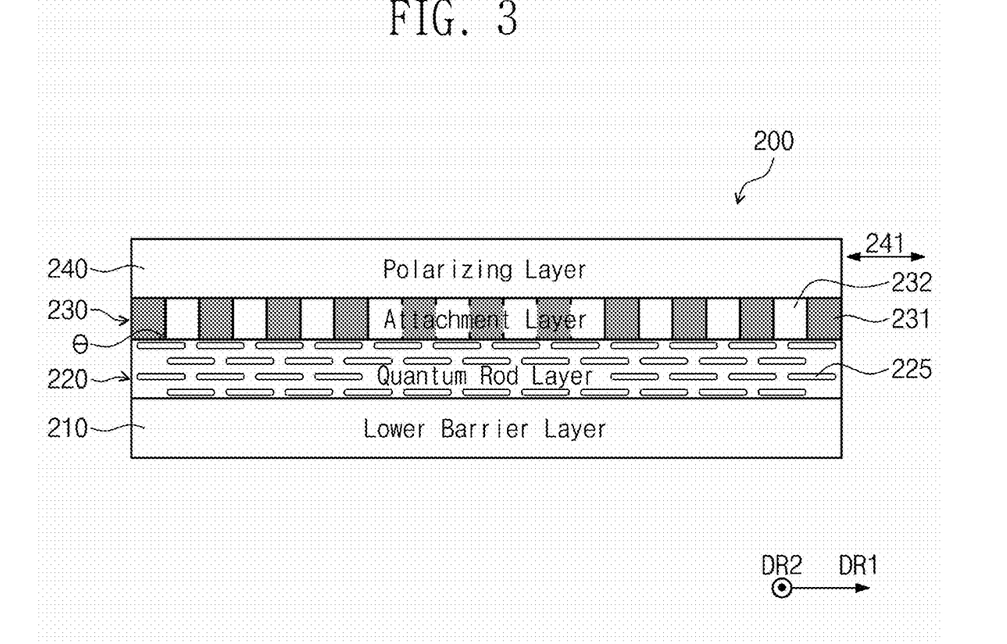
FIG. 3 is a cross-sectional view showing a polarizing light emitting plate according to an alternative exemplary embodiment of the disclosure.

FIG. 3 is a cross-sectional view showing a polarizing light emitting plate according to an alternative exemplary embodiment of the disclosure.

In an alternative exemplary embodiment, the upper barrier layer 250 shown in FIG. 2 may be omitted in the polarizing light emitting plate 200, as shown in FIG. 3. In such an embodiment, the upper surface of the polarizing layer 240 may be attached to a lower surface of a lower base substrate 330 (refer to FIG. 6) as described later, such that the polarizing light emitting plate 200 may be directly attached to the liquid crystal display panel 300 (refer to FIG. 6), and the lower base substrate 330 may perform the function of the upper barrier layer 250 that protects the polarizing layer 240 and the quantum rod layer 220.

Figure 4:
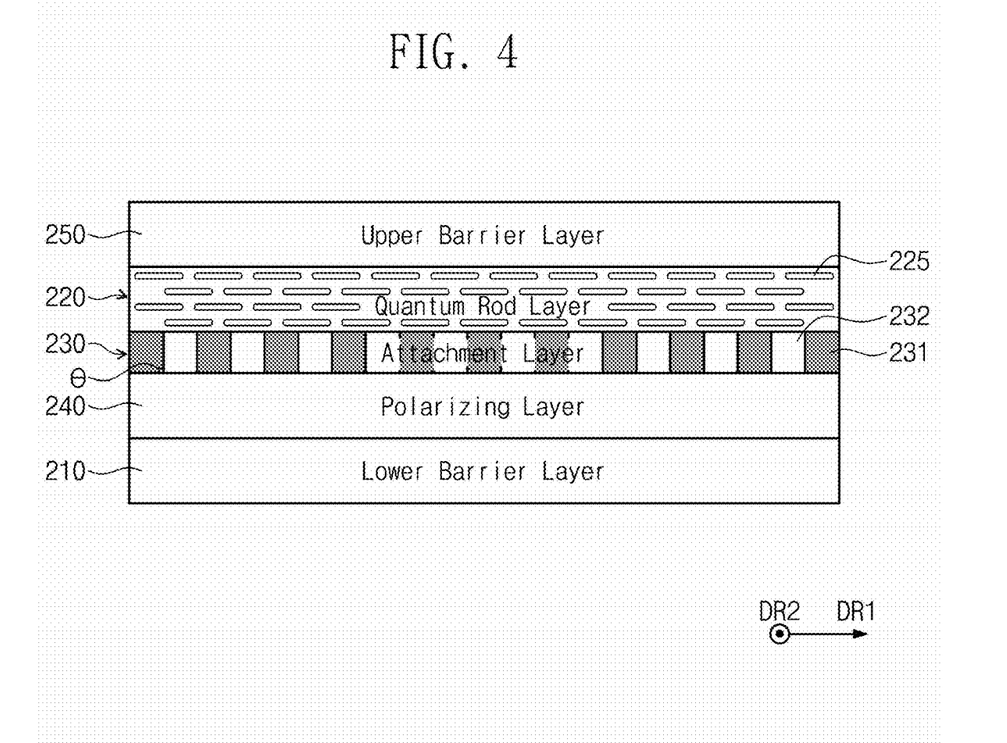
FIG. 4 is a cross-sectional view showing a polarizing light emitting plate according to an alternative exemplary embodiment of the disclosure.

FIG. 4 is a cross-sectional view showing a polarizing light emitting plate according to an alternative exemplary embodiment of the disclosure.

Referring to FIG. 4, in an exemplary embodiment, positions of the polarizing layer 240 and the quantum rod layer 220 may be changed with respect to each other. In such an embodiment, the polarizing layer 240 is disposed under the quantum rod layer 220. In such an embodiment, the upper surface of the attachment layer 230 is attached to the lower surface of the quantum rod layer 220, and the lower surface of the attachment layer 230 is attached to the upper surface of the polarizing layer 240.

In such an embodiment, the upper surface of the quantum rod layer 220 may be attached to the lower surface of the upper barrier layer 250, and the lower surface of the polarizing layer 240 may be attached to the upper surface of the lower barrier layer 210.

Figure 5A:
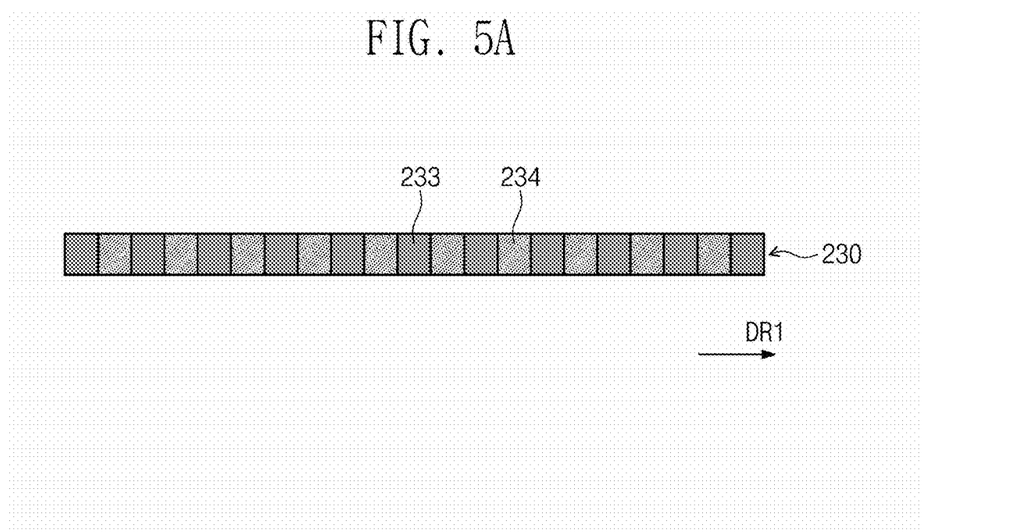
FIGS. 5A to 5C are cross-sectional views showing attachment layers according to exemplary embodiments of the disclosure.
Figure 5B:
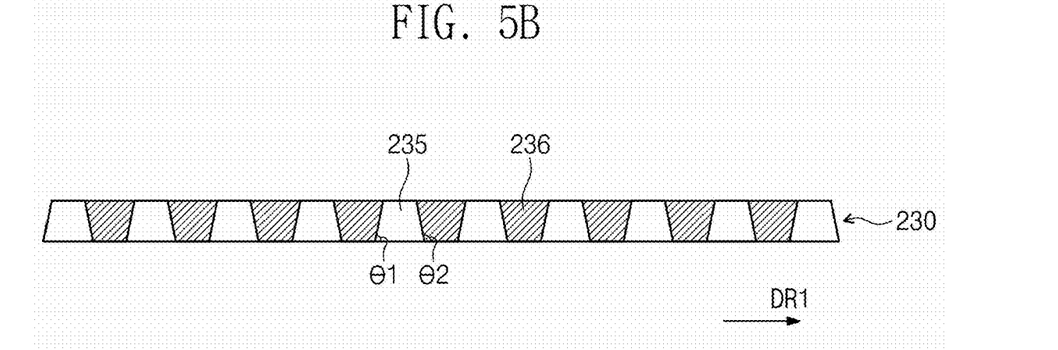
Figure 5C:
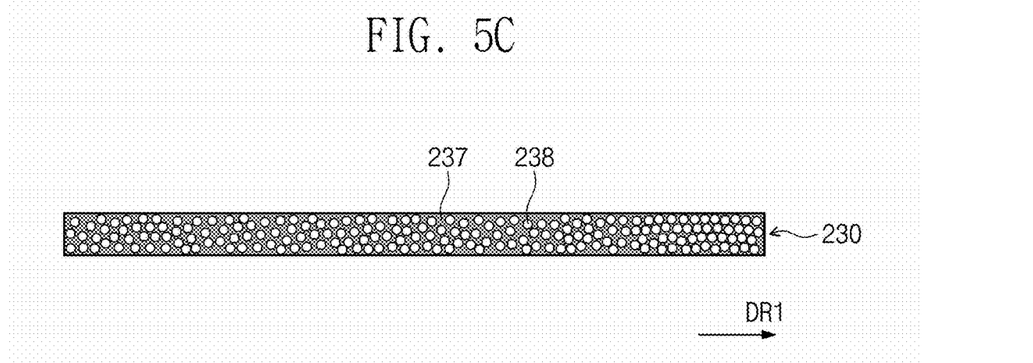

FIGS. 5A to 5C are cross-sectional views showing attachment layers according to exemplary embodiments of the disclosure.

In an exemplary embodiment, the first and second parts 231 and 232 of the attachment layer 230 may have various shapes and structures without being limited to those shown in FIG. 1.

Referring to FIG. 5A, in an exemplary embodiment, an attachment layer 230 includes a first part 233 and a second part 234. In such an embodiment, the first and second parts 233 and 234 respectively include first and second adhesive materials having different refractive indices from each other and are alternately arranged with each other in the first direction DR1.

Referring to FIG. 5B, in an alternative exemplary embodiment, an attachment layer 230 includes a first part 235 and a second part 236. In such an embodiment, as shown in FIG.

5B, the first part 235 may have a trapezoidal shape, in which a lower side is a long side and an upper side is a short side, in a cross-section, and the second part 236 may have a trapezoidal shape, in which a lower side is a short side and an upper side is a long side, in a cross-section. The first and second parts 235 and 236 are alternately arranged with each other in the first direction DR1, and side surfaces of the first part 235 make contact with side surfaces of the second part 236. First and second included angles θ1 and θ2 between the upper surface of the quantum rod layer 220 and a boundary surface between the first and second parts 235 and 236 may be in a range from about 80 degrees to about 100 degrees.

Referring to FIG. 5C, in another alternative exemplary embodiment, an attachment layer 230 includes an adhesive material 237 and a plurality of bubbles 238 disposed or distributed in the adhesive material 237. In such an embodiment, the adhesive material 237 may have a refractive index different from a refractive index of the bubbles 238. In one exemplary embodiment, for example, the bubbles 238 may be filled with air or air bubbles.

Figure 6:
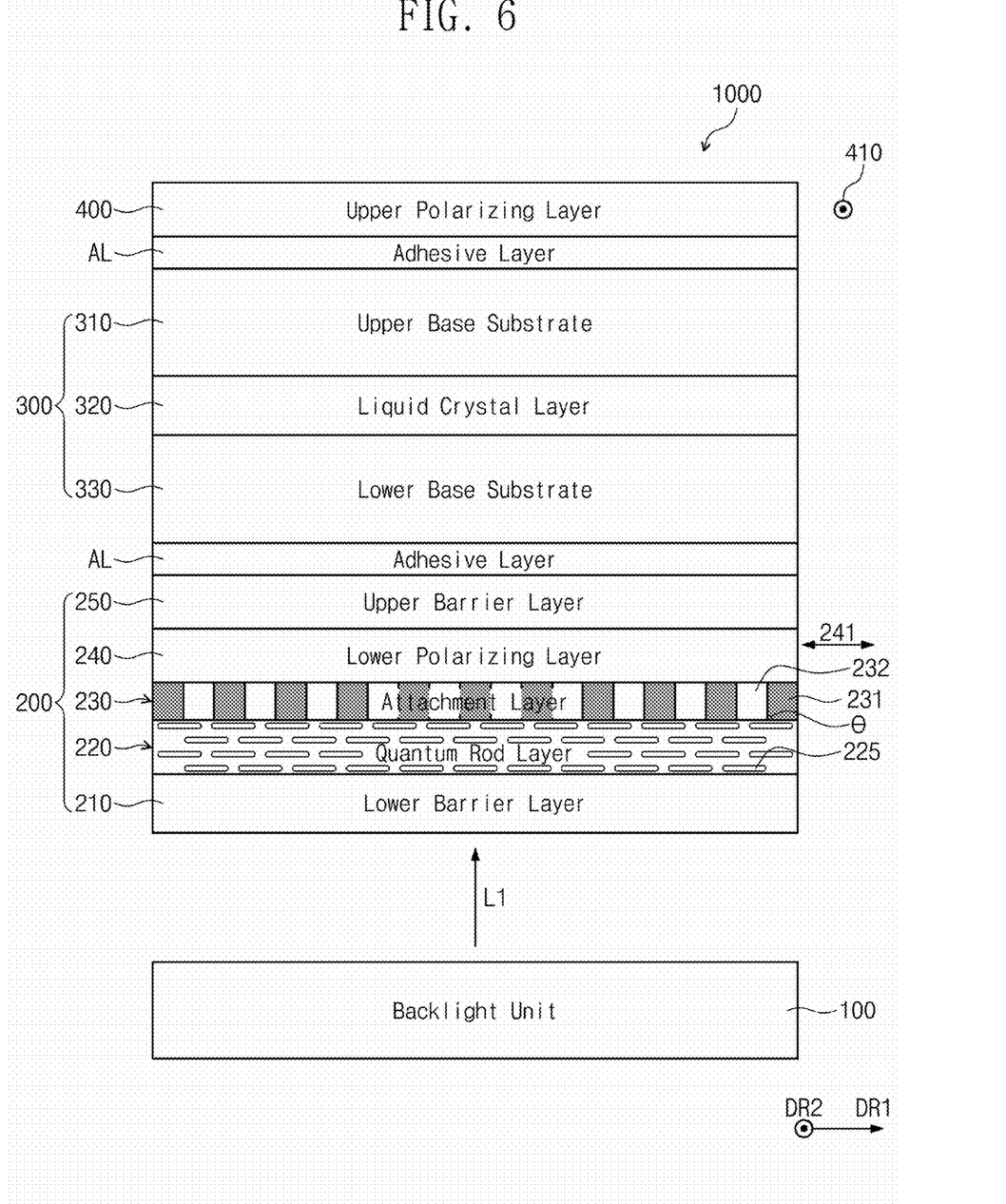
FIG. 6 is a cross-sectional view showing a display device according to an exemplary embodiment of the disclosure.

FIG. 6 is a cross-sectional view showing a display device 1000 according to an exemplary embodiment of the disclosure.

Referring to FIG. 6, an exemplary embodiment of the display device 1000 includes a backlight unit 100, the polarizing light emitting plate 200, a liquid crystal display panel 300, and an upper polarizing layer 400.

The liquid crystal display panel 300 includes an upper base substrate 310, a lower base substrate 330 coupled to the upper base substrate 310 to face the upper base substrate 310, and a liquid crystal layer 320 interposed between the lower base substrate 330 and the upper base substrate 310.

The liquid crystal display panel 300 may have a plate-like shape parallel to the first and second directions DR1 and DR2. Alternatively, the liquid crystal display panel 300 may be curved in at least one direction of the first and second directions DR1 and DR2.

The liquid crystal display panel 300 includes a plurality of pixels PX (refer to FIG. 7) described below. The pixel PX is an element for displaying a unit image, and a resolution of the liquid crystal display panel 300 is determined based on the number of the pixels PX arranged in the liquid crystal display panel 300. The pixels PX are arranged in a matrix form when viewed in a plan view.

In an exemplary embodiment, the upper and lower base substrates 310 and 330 may be, but not limited to, a glass substrate. In an alternative exemplary embodiment, the upper and lower base substrates 310 and 330 may be a flexible substrate that is curved when an external force is applied thereto. In such an embodiment, the upper and lower base substrates 310 and 330 may include a polymer having high heat resistance, high durability, and high flexibility, e.g., polyethylene terephthalate, polyethylene naphthalate, polycarbonate, polyarylate, polyetherimide, polyether sulfone, polyimide, or polymethyl methacrylate, etc.

The upper polarizing layer 400 is disposed on an upper surface of the upper base substrate 310. In an exemplary embodiment, the upper polarizing layer 400 is attached to the upper surface of the upper base substrate 310 by an adhesive layer AL. The adhesive layer AL includes an adhesive material, such as an optically clear adhesive.

The upper polarizing layer 400 has a first polarizing axis 410 substantially parallel to the second direction DR2. The upper polarizing layer 400 transmits only a light component polarized parallel to the first polarizing axis 410 among light components of the light incident thereto and absorbs or reflects light components polarized parallel to a direction substantially parallel to the first direction DR1 vertical to the second direction DR2.

The upper polarizing layer 400 may be formed by, after allowing dichroic iodine or dichroic dye to be adsorbed onto a polyvinyl alcohol resin film, drawing the resin film in along the elongation direction corresponding to the first direction DR1.

In such an embodiment, as described above, the polarizing light emitting plate 200 includes the lower barrier layer 210, the quantum rod layer 220, the attachment layer 230, the lower polarizing layer 240, and the upper barrier layer 250, which are sequentially stacked one on another. In such an embodiment, the lower polarizing layer 240 may be the same as the polarizing layer 240 shown in FIG. 1.

The polarizing light emitting plate 200 is disposed under the lower base substrate 330. In one exemplary embodiment, for example, the upper surface of the upper barrier layer 250 of the polarizing light emitting plate 200 is attached to the lower surface of the lower base substrate 330 by the adhesive layer AL, such that the polarizing light emitting plate 200 may be attached to the liquid crystal display panel 300.

In an exemplary embodiment, the polarizing light emitting plate 200 receives a first light L1 from the backlight unit 100 and generates a white light polarized in the first direction DR1 using the first light L1, and thus a color reproducibility and a light efficiency of the display device 1000 may be effectively improved.

The backlight unit 100 is disposed at a rear side of the polarizing light emitting plate 200 and generates the first light L1 to provide the first light L1 to the polarizing light emitting plate 200. The backlight unit 100 may be an edge-illumination type backlight unit including a light guide plate (not shown) and a light source that provides a light to a side surface of the light guide plate or a direct-illumination type backlight unit including a light source that directly provides the light to a rear surface of the polarizing light emitting plate 200. In one exemplary embodiment, for example, the light source may be, but not limited to, a light emitting diode.

The first light L1 may be a color light having a predetermined color. In an exemplary embodiment, the first light L1 may be a blue light.

Figure 7:
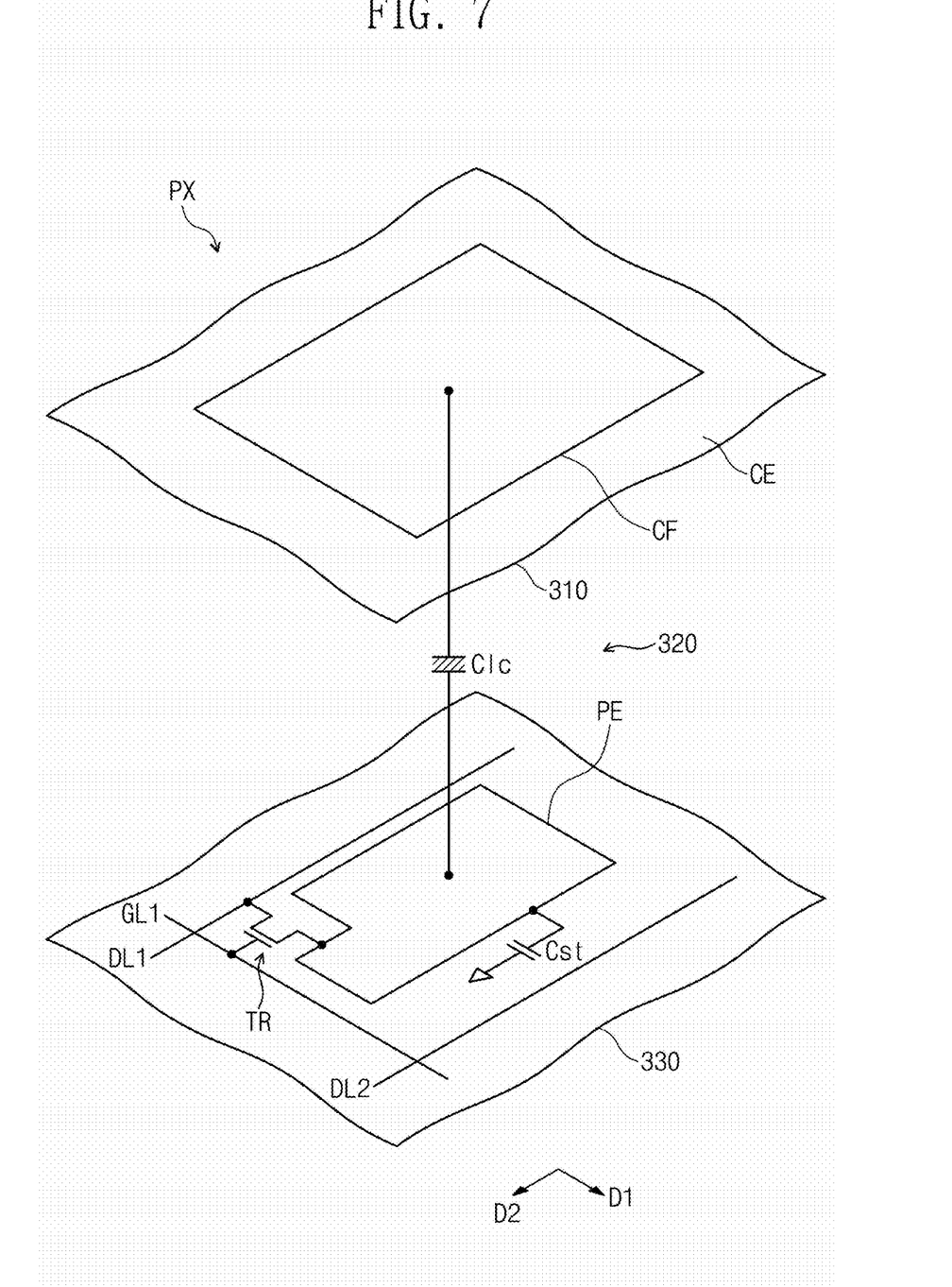
FIG. 7 is a perspective view showing a pixel according to an exemplary embodiment of the disclosure.

FIG. 7 is a perspective view showing a pixel according to an exemplary embodiment of the disclosure.

Referring to FIG. 7, an exemplary embodiment of the pixel PX includes a transistor TR connected to a gate line GL1 and a data line DL1, a liquid crystal capacitor Clc connected to the transistor TR, and a storage capacitor Cst connected to the liquid crystal capacitor Clc in parallel. Alternatively, the storage capacitor Cst may be omitted.

The transistor TR is disposed on the lower base substrate 330. The transistor TR includes a gate electrode connected to the gate line GL1, a source electrode connected to the data line DL1, and a drain electrode connected to the liquid crystal capacitor Clc and the storage capacitor Cst.

The liquid crystal capacitor Clc includes a pixel electrode PE disposed on the lower base substrate 330, a common electrode CE disposed on the upper base substrate 310, and the liquid crystal layer 320 interposed between the pixel electrode PE and the common electrode CE. The liquid crystal layer 320 serves as a dielectric substance. The pixel electrode PE is connected to the drain electrode of the transistor TR.

The common electrode CE may be disposed over an entire surface of the upper base substrate 310, but not being limited thereto or thereby. The common electrode CE is disposed on the lower base substrate 330. At least one of the pixel electrode PE and the common electrode CE may include a slit.

The storage capacitor Cst includes the pixel electrode PE, a storage electrode (not shown) branched from a storage line (not shown), and an insulating layer disposed between the pixel electrode PE and the storage electrode. The storage line may be disposed on the lower base substrate 330 and substantially simultaneously formed with the first gate line GL1 on a same layer. The storage electrode may partially overlap the pixel electrode PE.

The pixel PX may further include a color filter CF for displaying one of primary colors. In an exemplary embodiment, the color filter CF may be disposed on the upper base substrate 310. According to an alternative exemplary embodiment of the disclosure, the color filter CF may be disposed under the lower base substrate 330.

The transistor TR is turned on in response to a gate signal provided through the first gate line GL1, and a data voltage provided through the first data line DL1 is applied to the pixel electrode PE of the liquid crystal capacitor Clc through the turned-on transistor TR. The common electrode CE is applied with a common voltage.

Due to a difference in voltage level between the data voltage and the common voltage, an electric field is generated between the pixel electrode PE and the common electrode CE. Liquid crystal molecules of the liquid crystal layer 320 are driven by the electric field generated between the pixel electrode PE and the common electrode CE. A light transmittance of the liquid crystal layer 320 is controlled by the liquid crystal molecules driven by the electric field, and thus a desired image is displayed.

The storage line receives a storage voltage having a constant voltage level, but not being limited thereto or thereby. The storage line may receive the common voltage. The storage capacitor Cst maintains a voltage charged in the liquid crystal capacitor Clc.

Figure 8:
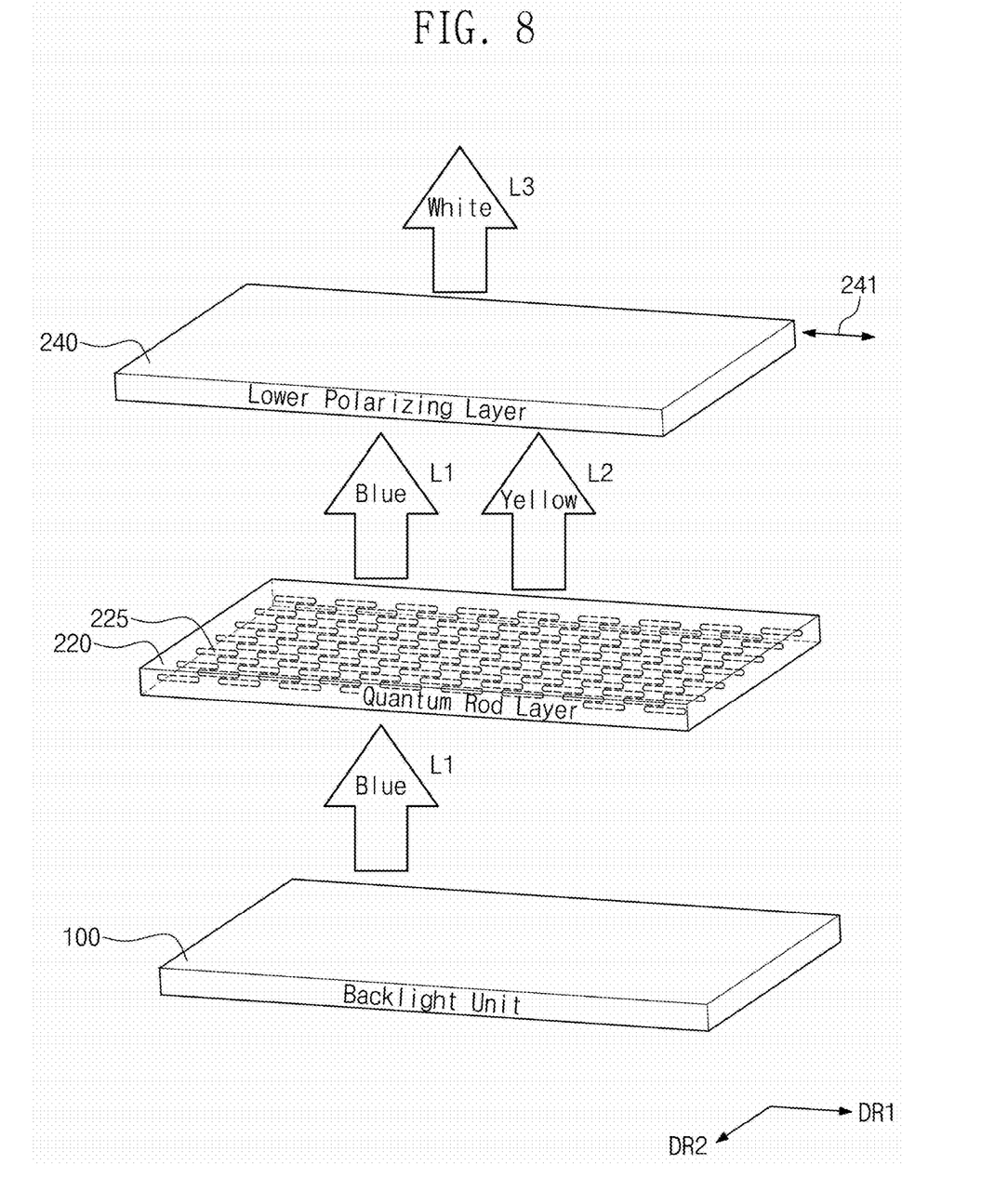
FIG. 8 is a perspective view showing an operation of a polarizing light emitting plate shown in FIG. 6.

FIG. 8 is a perspective view showing an operation of a polarizing light emitting plate shown in FIG. 6.

To explain the optical operation of the polarizing light emitting plate 200 shown in FIG. 6, FIG. 8 shows only the backlight unit 100, the quantum rod layer 220 and the lower polarizing layer 240, and the other elements of the polarizing light emitting plate 200 are not shown for convenience of illustration.

As shown in FIG. 8, an exemplary embodiment of the backlight unit 100 generates and outputs the first light L1. In one exemplary embodiment, for example, the first light L1 includes components polarized in the first and second directions DR1 and DR2, and the first light L1 is a blue light that is linearly or circularly polarized.

The quantum rod layer 220 receives the first light L1 from the backlight unit 100 and generates a second light L2 using the first light L1. In such an embodiment, the quantum rods 225 of the quantum rod layer 220 absorb a portion of the first light L1 to be excited and emit the second light L2. In such an embodiment, the second light L2 has a wavelength smaller than a wavelength of the first light L1, and the second light L2 may be a yellow light.

In an exemplary embodiment, where the quantum rods 225 are aligned in the first direction DR1, the quantum rods 225 emit the second light L2 that is linearly polarized in the first direction DR1. In such an embodiment, the second light L2 may include only components substantially parallel to the first direction DR1.

The lower polarizing layer 240 receives the first light L1 and the second light L2, which pass through the quantum rod layer 220. The second light L2 is linearly polarized parallel to the first polarizing axis 241 in the first direction DR1. Accordingly, most of the second light L2 passes through the lower polarizing layer 240 without being absorbed or reflected by the lower polarizing layer 240. The light components parallel to the first direction DR1 among the first light L1 pass through the lower polarizing layer 240, and the light components parallel to the second direction DR2 among the first light L1 are absorbed or reflected by the lower polarizing layer 240.

The first and second lights L1 and L2 passing through the lower polarizing layer 240 are mixed together to generate a third light L3. In such an embodiment, since the yellow color includes a red component and a green component, the second light L2 includes the red component and the green component. Accordingly, the blue component of the first light L1 is mixed with the red and green components of the second light L2 such that the white light is generated.

The third light L3 may be linearly polarized in the first direction DR1.

The color of the first and second lights L1 and L2 may not be limited to the above-mentioned color as long as the first and second lights L1 and L2 are mixed together and the white light is generated. In one alternative exemplary embodiment, for example, a combination of the first and second lights L1 and L2 is a combination of green light-magenta light or a combination of red light-cyan light.

The quantum rod 225 generates the linearly-polarized second light L2 as described above, and thus the second light L2 passes through the lower polarizing layer 240 without being absorbed or reflected by the lower polarizing layer 240. As a result, an optical loss of the light may be effectively reduced.

In such an embodiment, a spectrum of the second light L2 may be effectively determined by the quantum rods 225, and the display device 1000 (refer to FIG. 6) may have improved color reproduction rate.

For the convenience of illustration, the third light L3 is shown to be generated on the lower polarizing layer 240 in FIG. 8, but it may be understood that the third light L3 is generated under the lower polarizing layer 240 and is linearly polarized by the lower polarizing layer 240.

The first to third lights L1 to L3 (hereinafter, referred to as backlight lights) are guided along the first and second directions DR1 and DR2 in the polarizing light emitting plate 200. In such an embodiment, referring back to FIG. 6, the polarizing light emitting plate 200 is attached to the liquid crystal display panel 300, such that at least a portion of the backlight lights may be guided along the first and second directions DR1 and DR2 in the liquid crystal display panel 300.

In one exemplary embodiment, for example, an average refractive index of the attachment layer 230 may be smaller than a refractive index of the quantum rod layer 220. The average refractive index may be determined depending on an average refractive index of the first and second parts 231 and 232. In one exemplary embodiment, for example, the refractive index of at least one part of the first and second parts 231 and 232 may be smaller than the refractive index of the attachment layer 230. Accordingly, the guided lights from the backlight unit 100 are concentrated on the polarizing light emitting plate 200, and the light amount of the lights guided in the liquid crystal display panel 300 is reduced. Accordingly, a color mixture caused by the lights guided in the liquid crystal display panel 300 is reduced, and the brightness and the angle profile of the liquid crystal display panel 300 may be improved.

In an exemplary embodiment, as described above, the attachment layer 230 may perform the condensing function on backlight lights as the conventional light condensing sheet (or a prism sheet), and the backlight lights may be outputted in the vertical direction. In one exemplary embodiment, for example, the boundary surface between the first and second parts 231 and 232 may refract or reflect the light such that the path of the lights becomes vertical. Thus, the brightness and the angle profile of the display device 1000 may be controlled and improved.

Figure 9:
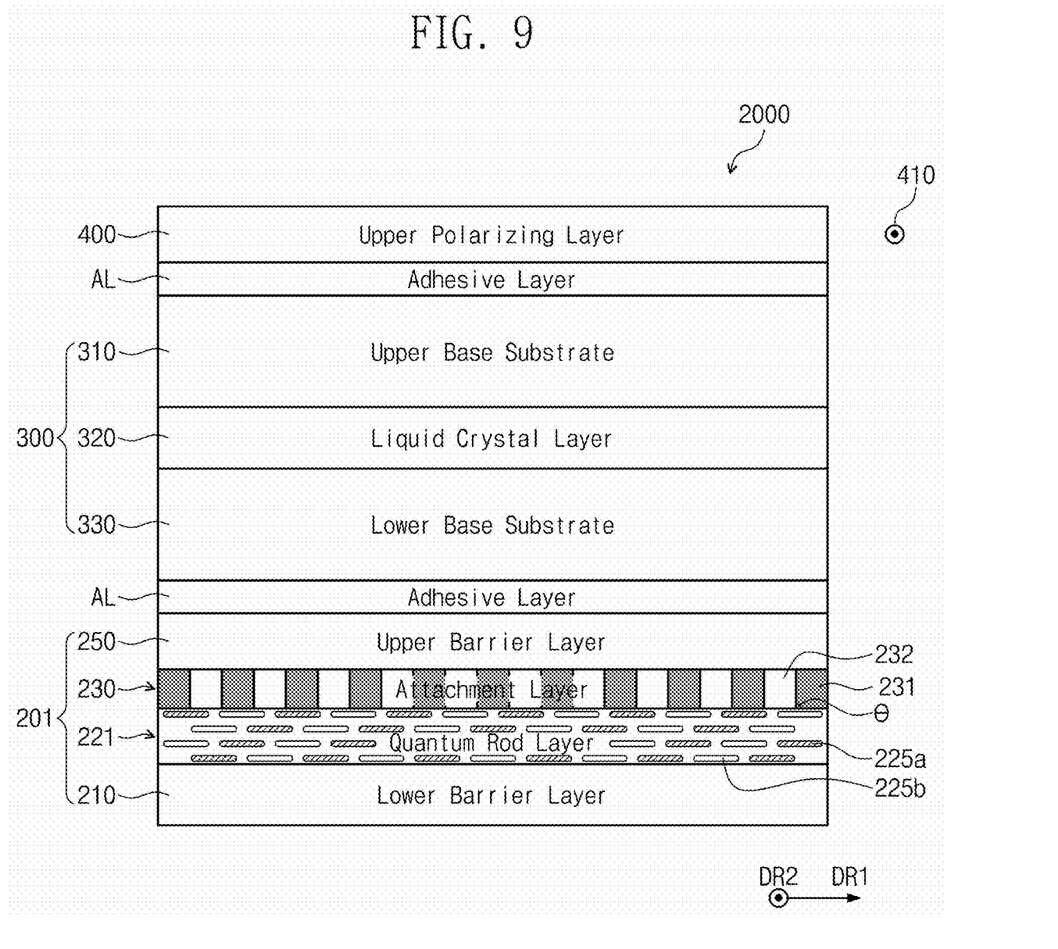
FIG. 9 is a cross-sectional view showing a display device according to an alternative exemplary embodiment of the disclosure.

FIG. 9 is a cross-sectional view showing a display device 2000 according to an alternative exemplary embodiment of the disclosure.

Referring to FIG. 9, the display device 2000 includes a polarizing light emitting plate 201 and the liquid crystal display panel 300.

The polarizing light emitting plate 201 includes a lower barrier layer 210, a quantum rod layer 221, the attachment layer 230, and the upper barrier layer 250.

The display device in FIG. 9 is substantially the same as the display device shown in FIG. 6 except for polarizing light emitting plate 201. In such an embodiment, the polarizing light emitting plate 201 has the same structure and function as those of the polarizing light emitting plate 200 shown in FIG. 1 except for the lower polarizing layer 240 and the quantum rod layer 220. The same or like elements shown in FIG. 9 have been labeled with the same reference characters as used above to describe the exemplary embodiments of the display device shown in FIG. 6, and any repetitive detailed description thereof will hereinafter be omitted or simplified.

The quantum rod layer 221 includes first quantum rods 225a and second quantum rods 225b. The first and second quantum rods 225a and 225b emit lights having different colors from each other. The first and second quantum rods 225a and 225b are uniformly mixed with each other and aligned in the first direction DR1.

The attachment layer 230 is interposed between the upper barrier layer 250 and the quantum rod layer 221. In one exemplary embodiment, for example, the attachment layer 230 is attached to entire surfaces or portions of surfaces of the upper barrier layer 250 and the quantum rod layer 221 to each other when viewed in a plan view. The attachment layer 230 attaches the upper barrier layer 250 and the quantum rod layer 221.

In an alternative exemplary embodiment, the upper barrier layer 250 and the adhesive layer AL may be omitted, and the quantum rod layer 221 may be directly attached to the lower base substrate 330 by the attachment layer 230. In such an embodiment, the lower base substrate 330 may perform a function of the upper barrier layer 250 instead to protect the lower polarizing layer 240 and the quantum rod layer 220.

Figure 10:
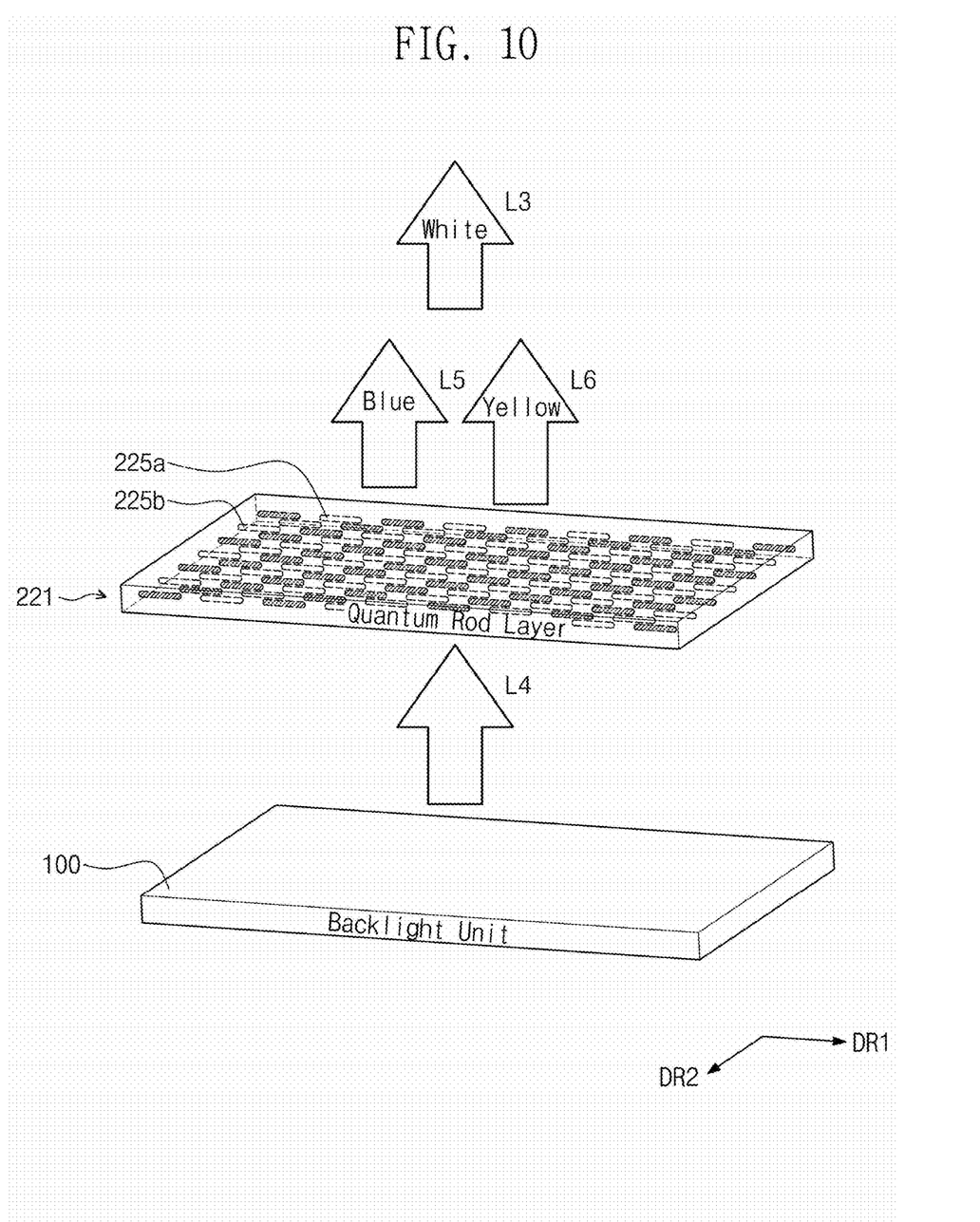
FIG. 10 is a perspective view showing an operation of a polarizing light emitting plate shown in FIG. 9.

FIG. 10 is a perspective view showing an operation of the polarizing light emitting plate 201 shown in FIG. 9. For convenience of illustration and description, FIG. 10 shows only the backlight unit 100 and the quantum rod layer 221.

Referring to FIG. 10, the backlight unit 100 generates and outputs a fourth light L4. The fourth light L4 is linearly or circularly polarized light, and includes components polarized in the first and second directions DR1 and DR2.

The quantum rod layer 221 receives the fourth light L4 from the backlight unit 100 and generates fifth and sixth lights L5 and L6 using the fourth light L4. In an exemplary embodiment, the first and second quantum rods 225a and 225b of the quantum rod layer 221 absorb the fourth light L4 to be excited and convert the fourth light L4 to the fifth and sixth lights L5 and L6 having different wavelengths from each other.

In an exemplary embodiment, the fifth and sixth lights L5 and L6 may be a blue light and a yellow light, respectively. In such an embodiment, the fourth light L4 has a wavelength smaller than that of the fifth and sixth lights L5 and L6 to excite the first and second quantum rods 225a and 225b. In one exemplary embodiment, for example, the fourth light L4 may be an ultraviolet ray, a deep-blue light having a wavelength shorter than that of the fifth light L5, or a violet light having a purple color.

In an exemplary embodiment, where the first and second quantum rods 225a and 225b are aligned in the first direction DR1, the first and second quantum rods 225a and 225b respectively emit the fifth and sixth lights L5 and L6 linearly polarized in the first direction DR1. In such an embodiment, the fifth and sixth lights L5 and L6 include components parallel to the first direction DR1.

The fifth and sixth lights L5 and L6 are mixed with each other to generate the white light as the third light L3. The third light L3 may be linearly polarized in the first direction DR1.

The color of the fifth and sixth lights L5 and L6 may not be limited to the above-mentioned color as long as the fifth and sixth lights L5 and L6 are mixed together and the white light is generated. In one alternative exemplary embodiment, for example, a combination of the fifth and sixth lights L5 and L6 may be a combination of green light-magenta light or a combination of red light-cyan light.

The first and second quantum rods 225a and 225b generate the linearly-polarized fifth and sixth lights L5 and L6 as described above, and thus the fifth and sixth lights L5 and L6 pass through the lower polarizing layer 240 without being absorbed or reflected by the lower polarizing layer 250. As a result, an optical loss of the light may be effectively reduced.

In such an embodiment, a spectrum of the fifth and sixth lights L5 and L6 may be effectively determined by the first and second quantum rods 225a and 225b, and the display device 2000 may have improved color reproduction rate.

In one exemplary embodiment, for example, where the third light L3 is linearly polarized in the first direction DR1, a separate polarizing layer, e.g., a lower polarizing layer 240 may be omitted from the polarizing light emitting plate 201. Accordingly, a thickness and a production cost of the display device 2000 may be reduced.

In an alternative exemplary embodiment, although not shown in figures, the quantum rod layer 221 may include first, second, third quantum rods that emit red, green, and blue lights, respectively. In such an embodiment, the red, green, and blue lights may be mixed with each other, and thus the white light may be generated.

Figure 11:
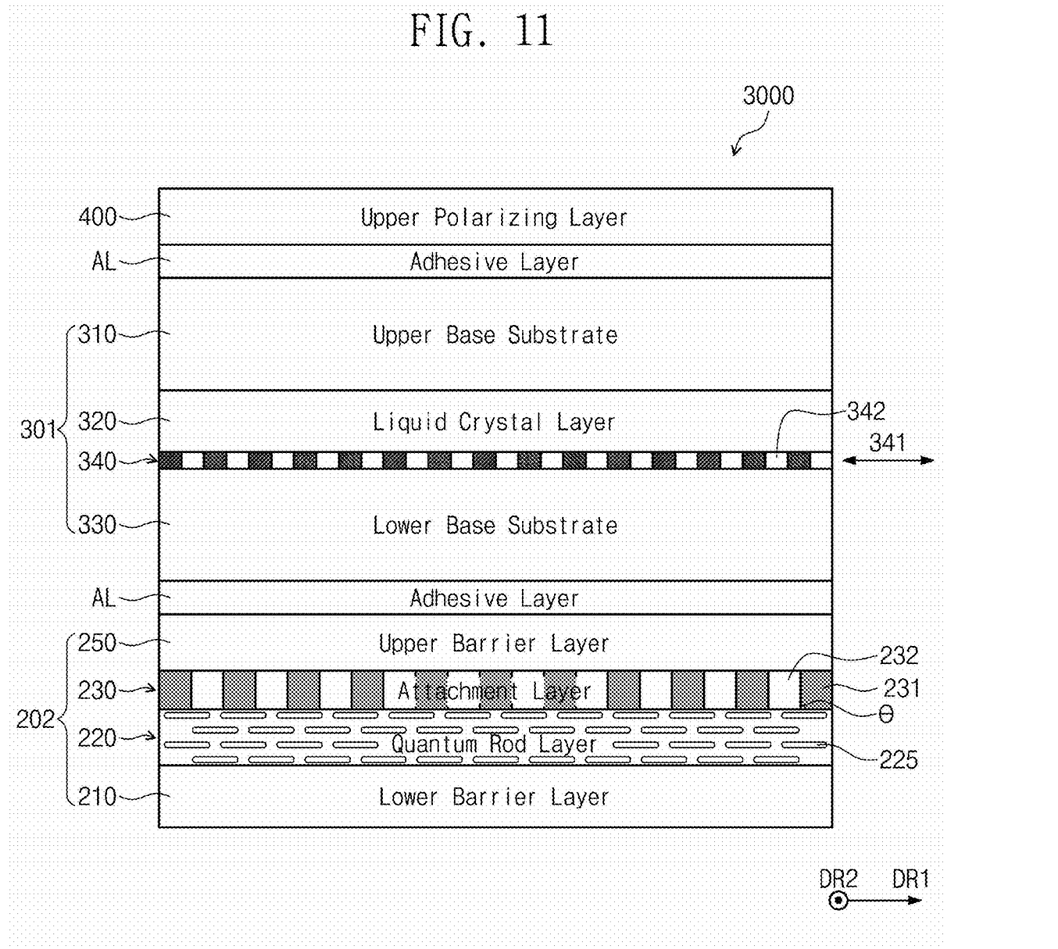
FIG. 11 is a cross-sectional view showing a display device according to another alternative exemplary embodiment of the disclosure.

FIG. 11 is a cross-sectional view showing a display device 3000 according to another alternative exemplary embodiment of the disclosure.

In an exemplary embodiment, as shown in FIG. 11, the lower polarizing layer 240 shown in FIG. 1 may be omitted from the display device 3000, and the liquid crystal display panel 301 may further include an in-cell polarizing layer 340 instead.

The in-cell polarizing layer 340 may be included in the liquid crystal display panel 301. The in-cell polarizing layer 340 may be disposed on the lower base substrate 330. The in-cell polarizing layer 340 may have a third polarizing axis 341 substantially parallel to the first direction DR1. The in-cell polarizing layer 340 transmits only light components polarized parallel to the third polarizing axis 341 among components of the light incident thereto, and absorbs or reflects light components polarized parallel to the second direction DR2.

In such an embodiment, the in-cell polarizing layer 340 may include a plurality of wire grid patterns 342 extending in the second direction DR2. The wire grid patterns 342 may include a metal, such as silver (Ag), for example.

In such an embodiment, a polarizing light emitting plate 202 shown in FIG. 11 has the same structure and function as those of the polarizing light emitting plate 200 shown in FIG. 3A except that the lower polarizing layer 240 is omitted. In such an embodiment, the upper surface of the attachment layer 230 is attached to the lower surface of the upper barrier layer 250.

In an exemplary embodiment, as shown in FIG. 11, the lower polarizing layer 240 may be replaced with the in-cell polarizing layer 340, and thus a polarizing layer, e.g., the lower polarizing layer 240, may be omitted from the polarizing light emitting plate 201. Thus, the thickness and the production cost of the display device 1000 may be reduced.

In an alternative exemplary embodiment, although not shown in figures, the upper barrier layer 250 and the adhesive layer AL may be omitted, and the quantum rod layer 220 may be directly attached to the lower base substrate 330 through the attachment layer 250. In such an embodiment, the lower base substrate 330 may perform the function of the upper barrier layer 250 instead to protect the lower polarizing layer 240 and the quantum rod layer 220.

Although the exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:

1. A polarizing light emitting plate comprising:
a polarizing layer having a polarizing axis substantially parallel to a first direction;
a quantum rod layer comprising quantum rods aligned in the first direction; and
an attachment layer between the polarizing layer and the quantum rod layer,
wherein the attachment layer comprises a first part and a second part,
the first part is a first adhesive material of a first refractive index and is directly attached to the polarizing layer and the quantum rod layer, and
the second part is a second adhesive material of a second refractive index different from the first refractive index.

2. The polarizing light emitting plate of claim 1, wherein the attachment layer has an average refractive index of the first and second parts smaller than a refractive index of the quantum rod layer.

3. The polarizing light emitting plate of claim 1, wherein the second adhesive material is different from the first adhesive material.

4. The polarizing light emitting plate of claim 1, wherein an included angle between an upper surface of the quantum rod layer and a boundary surface between the first and second parts is in a range from about 70 degrees to about 110 degrees.

5. The polarizing light emitting plate of claim 1, wherein the quantum rods comprise first quantum rods and second quantum rods,
the first quantum rods convert a first color light to a second color light, and
the second quantum rods convert the first color light to a third color light,
wherein the first color light, the second color light and the third color light have different colors from each other.

6. The polarizing light emitting plate of claim 1, further comprising:
a first barrier layer attached to an outer surface of a combination of the quantum rod layer, the attachment layer and the polarizing layer.

7. The polarizing light emitting plate of claim 6, further comprising:
a second barrier layer attached to another outer surface of the combination of the quantum rod layer, the attachment layer and the polarizing layer.

8. The polarizing light emitting plate of claim 7, wherein the first and second barrier layers have different vapor permeabilities from each other.

9. A liquid crystal display device comprising:
a backlight unit;
a liquid crystal display panel disposed above the backlight unit;
a polarizing light emitting plate interposed between the liquid crystal display panel and the backlight unit, wherein the polarizing light emitting plate comprises a lower polarizing layer, a quantum rod layer comprising quantum rods aligned in a predetermined direction and an attachment layer comprising a first part and a second part, the first part is a first adhesive material of a first refractive index, is directly attached to the lower polarizing layer and the quantum rod layer, and has a trapezoidal shape in a cross-sectional view, and the second part has a second refractive index different from the first refractive index.

10. A liquid crystal display device of claim 9 further comprising:
an adhesive layer interposed between the polarizing light emitting plate and the liquid crystal display panel to attach the polarizing light emitting plate to a lower surface of the liquid crystal display panel.

11. The liquid crystal display device of claim 9, wherein the lower polarizing layer has a polarizing axis substantially parallel to a first direction, and
the quantum rods are aligned in the first direction.

12. The liquid crystal display device of claim 11, further comprising:
an upper polarizing layer disposed on an upper surface of the liquid crystal display panel and having a polarizing axis substantially parallel to a second direction substantially perpendicular to the first direction.

13. The liquid crystal display device of claim 9, wherein the polarizing light emitting plate further comprises:
an upper barrier layer interposed between the quantum rod layer and the liquid crystal display panel; and
a lower barrier layer disposed under the quantum rod layer.

14. The liquid crystal display device of claim 13, wherein the upper barrier layer is disposed on an upper surface of the lower polarizing layer, and
the lower barrier layer is disposed on a lower surface of the quantum rod layer.

15. The liquid crystal display device of claim 14, wherein the upper barrier layer is attached to the lower surface of the liquid crystal display panel.

16. The liquid crystal display device of claim 15, wherein the lower barrier layer has a vapor permeability smaller than a vapor permeability of the upper barrier layer.

17. The liquid crystal display device of claim 16, wherein the vapor permeability of the lower barrier layer is equal to or smaller than about $10^{-3}$ g/m$^2$ day.

18. The liquid crystal display device of claim 9, wherein
the backlight unit outputs a first color light, which is linearly polarized in a first direction, and
the quantum rods are aligned in the first direction.

19. The liquid crystal display device of claim 18, wherein
the quantum rods comprise first quantum rods and second quantum rods,
the first quantum rods convert a portion of the first color light to a second color light, and
the second quantum rods convert a portion of the first color light to a third color light,
wherein the first color light, the second color light and the third color light have different colors from each other.

20. The liquid crystal display device of claim 19, wherein the first color light has a wavelength smaller than wavelengths of the second and third color lights.

21. The liquid crystal display device of claim 9, wherein
the backlight unit outputs a first color light having a first wavelength, and
the quantum rods convert a portion of the first color light to a second color light having a second wavelength different from the first wavelength.

22. The liquid crystal display device of claim 21, wherein a color of a light obtained by mixing the first and second color lights is a white color.

23. A liquid crystal display device comprising:
a backlight unit;
a liquid crystal display panel disposed above the backlight unit; and
a polarizing light emitting plate interposed between the liquid crystal display panel and the backlight unit, wherein the polarizing light emitting plate comprises a quantum rod layer comprising quantum rods aligned in a predetermined direction and an attachment layer comprising a first part and a second part alternately arranged with each other in a plan view, the first part is a first adhesive material of a first refractive index, is directly attached to the quantum rod layer, and has a trapezoidal shape in a cross-sectional view, the second part has a second refractive index different from the first refractive index, and a boundary surface between the first and second parts is inclined with respect to an upper surface of the quantum rod layer,
wherein the liquid crystal display panel comprises:
a lower base substrate;
an in-cell polarizing layer disposed on the lower base substrate;
a liquid crystal layer disposed on the in-cell polarizing layer; and
an upper base substrate disposed on the liquid crystal layer.

24. The liquid crystal display device of claim 23, wherein
the in-cell polarizing layer has a polarizing axis substantially parallel to a first direction, and
the quantum rods are aligned in the first direction.

25. The liquid crystal display device of claim 24, wherein the in-cell polarizing layer comprises a wire grid pattern extending in a second direction substantially vertical to the first direction.

* * * * *